Figure 1:
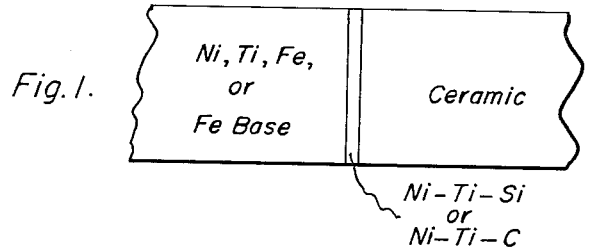

May 28, 1963

J. H. WESTBROOK ETAL 3,091,028

METHOD AND ALLOY FOR BONDING TO NON-METALLIC REFRACTORY MEMBERS

Filed Sept. 2, 1960

Inventors:
John H. Westbrook;
Edward R. Stover,
by Paul R. Webb, II
Their Attorney.

United States Patent Office 3,091,028
Patented May 28, 1963

3,091,028
METHOD AND ALLOY FOR BONDING TO NON-METALLIC REFRACTORY MEMBERS
John H. Westbrook, Ballston Spa, and Edward R. Stover, Schenectady, N.Y., assignors to General Electric Company, a corporation of New York
Filed Sept. 2, 1960, Ser. No. 53,652
9 Claims. (Cl. 29—473.1)

The present invention relates to improved bonds and methods of bonding non-metallic refractory members to metal members as well as non-metallic refractory members to non-metallic refractory members.

One solution to bonding non-metallic refractory members together or to metallic members has been advanced by James E. Beggs in his patent for Metallic Bond, No. 2,857,663, patented October 28, 1958, and assigned to the assignee of this invention. In accordance with the method described in his patent, a metal member and a non-metallic body are placed in a stack with a metal shim member interposed therebetween, one of the members consisting essentially of a metal selected from the group consisting of titanium, zirconium, hafnium, thorium and alloys of more than one metal of the group and the other metal member consisting of a metal selected from the group consisting of copper, nickel, iron, molybdenum, chromium, platinum, cobalt, and alloys of more than one metal of the group. The stack is heated in a non-reactive atmosphere to a temperature at least equal to the melting point of the eutectic alloy of the metal member and the metal shim member and below the melting point of both these members to form in place a molten reactive alloy which wets the non-metallic refractory body. The stack is then cooled to provide a bond capable of withstanding a temperature substantially equal to that at which the bond was formed.

Even when this method is used, it is possible for one or more of the intermetallic compounds to form of the formula types $Ti_2M$, $TiM$, or $TiM_3$ where M is iron, nickel or cobalt. Formation of such binary compounds results in a brittle and weak layer in the bond and might, therefore, be a source of weakness in the brazed bond. Thus, it is desirable to have a metallic bond in which the formation of such brittle intermetallic titanium alloy is avoided or in which the adverse effects of their presence are alleviated by the concomitant formation of a tough intermediate layer.

It is an object of our invention to provide a bond and method of bonding non-metallic refractory bodies together as well as to metal members.

It is another object of our invention to provide a brazing alloy of nickel, titanium and an element from the group consisting of silicon and carbon.

It is another object of our invention to provide a method of bonding a non-metallic refractory body to a non-metallic refractory body as well as to a metal member with a nockel-titanium-silicon alloy inserted between the members to be bonded together.

It is another object of our invention to provide a method of bonding a non-metallic refractory body to a non-metallic refractory body as well as to a metal member with a nickel-titanium-carbon alloy inserted between the members to be bonded together.

It is a further object of our invention to provide an article bonded together by an alloy of nickel, titanium and an element from the group consisting of silicon and carbon.

In carrying out our invention in one form, a hermetically tight bond is formed between a non-metallic refractory body and a metal member by placing a non-metallic refractory body and a metal member in a stack with an alloy consisting of nickel, titanium and an element from the group consisting of silicon or carbon interposed therebetween, heating the stack in a non-reactive atmosphere to a temperature at which a liquid is formed of the alloy, and then allowing the liquid to solidify thereby forming the bond. The metal member consists of titanium, nickel, iron or an iron base metal.

Figure 2:
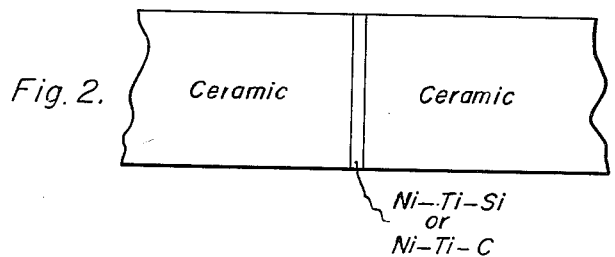
Figure 3:
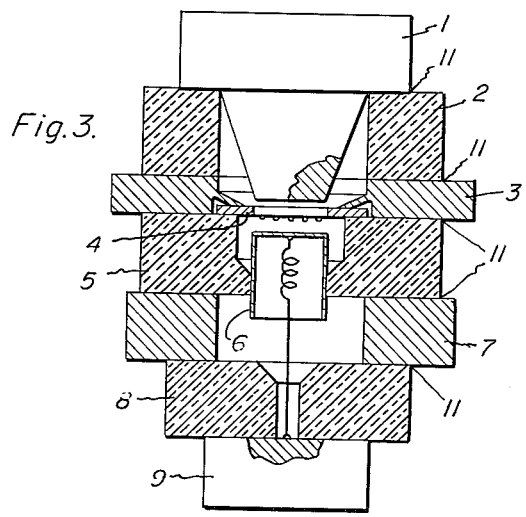

These and various other objects, features and advantages of the invention will be better understood from the following description taken in connection with the accompanying drawing in which:

FIGURE 1 is an illustrative example of a bond that may be formed by the method of our invention which employs a metal member of titanium, nickel, iron or an iron base alloy;

FIGURE 2 is an illustrative example of a bond that may be formed by the method of our invention in which two non-metallic refractory bodies are bonded together by employing an interposed alloy consisting of nickel, titanium and an element from the group consisting of silicon and carbon; and FIGURE 3 is a partial sectional view of a miniature vacuum tube constructed in accordance with our invention.

We discovered unexpectedly that alloys consisting of nickel, 50 to 55 atomic percent titanium, and 0.3 to 10 atomic percent of an element selected from the group consisting of silicon and carbon produced strong metallic bonds between non-metallic refractory bodies as well as between refractory bodies and metal members. We found further that these alloys formed liquid phases at temperatures in the range of 950° C. to 1200° C. As cast, such compositions possess unusual ductility and strength despite the fact that microstructurally they consist of an agglomeration of two or more intermetallic compound phases with no pure metal present. Therefore, it does not appear necessary to have a truly single phase microstructure to achieve a significant amount of toughness.

During the research which led to the discovery of these alloys of nickel, titanium and an element selected from the group consisting of silicon and carbon, a series of small arc melted buttons were prepared. Typical compositions in atomic percent were as follows: 39.6 Ni—54.2 Ti—6.3 Si, 47.9 Ni—50.0 Ti—2.1 Si, and 47.9 Ni—50.0 Ti—2.1 C.

In FIGURE 1 of the drawing, a titanium, nickel, silicon, iron or iron base metal member may be bonded to a non-metallic refractory body by placing between the member and the body an alloy of nickel, 50 to 55 atomic percent titanium, and 0.3 to 10 atomic percent of an element selected from the group consisting of silicon and carbon. For example, a titanium tube member may be bonded to a ceramic tube body by placing such an alloy shim between the member and the body. This stack is then held in contact and heated to the melting point of the alloy which is in the temperature range of 950° C. to 1200° C. The temperature is maintained until the alloy is melted and then the stack is allowed to cool.

FIGURE 2 is illustrative of the manner in which non-metallic refractories may be bonded to other non-metallic refractories in accordance with our invention. Such bodies are bonded by inserting therebetween an alloy of nickel, titanium and an element selected from the group consisting of silicon and carbon. The bodies and the alloy are then held in contact and heated to a temperature range of 950° C. to 1200° C. until the alloy is melted and then allowed to cool.

The temperature range of 950° C. to 1200° C. at which the nickel-50 to 55 titanium-0.3 to 10 silicon or carbon alloy compositions are formed is below the melting point of any one of the metal members and the softening point of a large number of non-metallic refractories. Therefore, a very satisfactory bond is obtained without heating the metal members to a point at which the vapor pressure becomes appreciable and without heating the non-metallic refractory bodies to temperatures at which they soften. This is particularly desirable in the construction of vacuum tubes since the contaminating or deforming effects which accompany the heating of tube parts very close to their melting temperature are avoided.

The non-metallic refractories used frequently in electron tube manufacture are tabulated in Table I which includes the temperature range at which they are formed. The formation temperature or softening temperature of a ceramic depends not only on the base material, but also on the type and variety of flux used. All of the below-mentioned ceramics are satisfactory for use in electron tubes since they have thermal coefficients of expansions sufficiently close to thermal coefficients of expansion of metals suitable for use in construction of electron tubes.

TABLE I

Ceramics

| Class of ceramic | Appl. chem. composition | Usual maturing Temp, (Firing), ° C. |
| --- | --- | --- |
| Corundum | (Al₂O₃) | 1,400-1,700 |
| Forsterite | (2MgO 1SiO₂) | 1,200-1,400 |
| Steatite | (1MgO 1SiO₂) | 1,200-1,300 |
| Beryllia | (BeO) | 1,400-1,800 |
| Zircon (+Talc) | ZrO₂SiO₂(+MgO and Al₂O₃) | 1,200-1,350 |

In FIGURE 3 of the drawing there is an application of our invention as it applies to the construction of a miniature triode. FIGURE 3 shows a triode consisting of an anode 1, ceramic spacer 2, grid connector 3, grid 4, ceramic spacer 5, cathode assembly 6, cathode connector 7, ceramic spacer 8, and heater 9. Members 1, 3, 4, 7 and 9 as well as cathode 6 are made of titanium metal. Cathode 6 is electrically connected to cathode connector 7 by means of a thin conductive film which formed on the lower side of ceramic spacer 5. Ceramic members 2, 5 and 8 are selected from a variety of ceramic having a thermal coefficient of expansion very nearly that of titanium. The tube is formed by stacking the members in the illustrated order with an alloy of nickel, 50 to 55 atomic percent titanium and 0.3 to 10 atomic percent of an element selected from the group consisting of silicon and carbon between the parts at the points marked 11. The assembled tube parts and metal members are held together and placed in the chamber which is evacuated to a pressure less than 1 micron. The tube parts and metal members are then heated to a temperature exceeding 950° C. by conventional induction heating apparatus. After the tube structure reaches a temperature of above 950° C., the alloy is melted and hermetically seals the tube joints. The tube structure is then allowed to cool in vacuum until the liquid alloy solidifies.

A tube formed in this fashion is very nearly completely free from contamination from evaporated metal. The bonding material which consists of a nickel-titanium-silicon or nickel-titanium-carbon alloy has a thermal coefficient expansion which is nearly that of titanium and ceramic and is formed at a temperature below the softening point of the ceramic. Thus, there is formed a bond, all parts of which have approximately the same coefficient of expansion which is desirable in construction of tubes of the type illustrated in FIGURE 3 of the drawing.

The method of bonding of our invention is particularly advantageous in the construction of vacuum tubes. The metallic bond is comprised in part of a tough metallic layer which does not form to any significant extent in bonds formed utilizing only metals of the titanium, hafnium, zirconium and thorium group and those of the iron group. Therefore, the tendency toward weak spots and leaks is avoided. Since no gases are formed or liberated during sealing of a bond formed of metal members in accordance with our invention, it is not necessary to degas the tube.

The bond formed in accordance with the method of our invention may be obtained by heating the parts in any atmosphere which is relatively inert to titanium, nickel, iron or iron base metals. For example, the parts may be bonded in an atmosphere of argon, helium or in a vacuum. The heat may be applied in any suitable fashion.

While other modifications of this invention and variations of methods which may be employed within the scope of the invention have not been described, the invention is intended to include such that may be embraced within the following claims.

What we claim as new and desire to secure by Letters Patent of the United States is:

1. A method of making a bond between a metal member and a non-metallic refractory body which comprises placing said metal member selected from the group consisting of nickel, titanium, iron and iron base metals, and said body in a stack with an alloy 50 to 55 atomic percent titanium, 0.3 to 10 atomic percent of an element selected from the group consisting of silicon and carbon, and the balance being nickel interposed between said metal member and said body, heating the stack in a non-reactive atmosphere to a temperature at least equal to the melting point of said alloy and below the melting point of said member and said body to form in place a molten reactive alloy which wets the non-metallic refractory body, and cooling the stack to provide a bond capable of withstanding a temperature substantially equal to that at which the bond was formed.

2. A method of making a bond between a metal member and a non-metallic refractory body which comprises placing said metal member selected from the group consisting of nickel, titanium, iron and iron base metals, and said body in a stack with an alloy of 47.9 atomic percent nickel, 50.0 atomic percent titanium, and 2.1 atomic percent silicon interposed between said metal member and said body, heating the stack in a non-reactive atmosphere to a temperature at least equal to the melting point of said alloy and below the melting point of said member and said body in place of molten reactive alloy which wets the non-metallic refractory body, and cooling the stack to provide a bond capable of withstanding a temperature substantially equal to that at which the bond was formed.

3. A method of making a bond between a metal member and a non-metallic refractory body which comprises placing said metal member selected from the group consisting of nickel, titanium, iron and iron base metals, and said body in a stack with an alloy of 47.9 atomic percent nickel, 50.0 atomic percent titanium, and 2.1 atomic percent carbon interposed between said metal member and said body, heating the stack in a non-reactive atmosphere to a temperature at least equal to the melting point of said alloy and below the melting point of said members and said body to form in place a molten reactive alloy which wets the non-metallic refractory body, and cooling the stack to provide a bond capable of withstanding a temperature substantially equal to that at which the bond was formed.

4. A method of making a vacuum tight bond between a metal member and a hollow cylindrical non-metallic refractory body which comprises placing said titanium metal member and said body in a stack with an alloy of 50 to 55 atomic percent titanium, 0.3 to 10 atomic percent of an element selected from the group consisting of silicon and carbon, and the balance being nickel interposed between said metal member and an annular end of said body, heating the stack in a non-reactive atmosphere to a temperature at least equal to the melting point of both of said alloy and below the melting point of said member and said body to form in place a molten reactive alloy which wets the non-metallic refractory body, and cooling the stack to provide a bond capable of withstanding a temperature substantially equal to that at which the bond was formed.

5. A method of making a bond between non-metallic refractory bodies which comprises placing said bodies in a stack with an alloy of 50 to 55 atomic percent titanium, 0.3 to 10 atomic percent of an element selected from the group consisting of silicon and carbon, and the balance being nickel interposed between said bodies, heating the stack in a non-reactive atmosphere to a temperature at least equal to the melting point of said alloy and below the melting point of both of said bodies to form in place a molten reactive alloy which wets the non-metallic refractory bodies, and cooling the stack to provide a bond capable of withstanding a temperature substantially equal to that at which the bond was formed.

6. An alloy which consists of 50 to 55 atomic percent titanium, 0.3 to 10 atomic percent of an element selected from the group consisting of silicon and carbon, and the balance being nickel.

7. An alloy which consists of 39.6 atomic percent nickel, 54.2 atomic percent titanium, and 6.2 atomic percent carbon.

8. An alloy which consists of 47.9 atomic percent nickel, 50.0 atomic percent titanium, and 2.1 atomic percent silicon.

9. An alloy which consists of 47.9 atomic percent nickel, 50.0 atomic percent titanium, and 2.1 atomic percent carbon.

References Cited in the file of this patent

UNITED STATES PATENTS

| | | |
|---|---|---|
| 2,728,425 | Day | Dec. 27, 1955 |
| 2,760,261 | Pawlyk et al. | Aug. 28, 1956 |
| 2,857,663 | Beggs | Oct. 28, 1958 |
| 2,917,140 | Onley | Dec. 15, 1959 |